United States Patent [19]

McCoy et al.

[11] 4,371,444

[45] * Feb. 1, 1983

[54] PROCESS FOR SECONDARY RECOVERY

[75] Inventors: David R. McCoy; Carter G. Naylor, both of Austin, Tex.

[73] Assignee: Texaco Inc., White Plains, N.Y.

[*] Notice: The portion of the term of this patent subsequent to Sep. 8, 1998, has been disclaimed.

[21] Appl. No.: 261,853

[22] Filed: May 8, 1981

Related U.S. Application Data

[63] Continuation-in-part of Ser. No. 112,582, Jan. 16, 1980, abandoned.

[51] Int. Cl.$^3$ .............................................. E21B 43/22
[52] U.S. Cl. .................................. 252/8.55 D; 166/275
[58] Field of Search ..................... 252/8.55 D; 166/274, 166/275

[56] References Cited

U.S. PATENT DOCUMENTS

| | | | |
|---|---|---|---|
| 2,226,119 | 12/1940 | De Groote et al. | 252/8.55 |
| 2,233,381 | 2/1941 | De Groote et al. | 252/8.55 |
| 3,508,612 | 4/1970 | Reisberg et al. | 252/8.55 X |
| 3,779,917 | 12/1973 | Norton et al. | 252/8.55 |
| 3,811,504 | 5/1974 | Flournoy et al. | 166/274 |
| 3,811,505 | 5/1974 | Flournoy et al. | 166/274 |
| 4,044,831 | 8/1977 | Allen | 252/8.55 |
| 4,110,228 | 8/1978 | Tyler et al. | 252/8.55 |

*Primary Examiner*—Herbert B. Guynn
*Attorney, Agent, or Firm*—Jack H. Park; Walter D. Hunter

[57] ABSTRACT

Hydrocarbons are recovered from a subterranean hydrocarbon-bearing formation penetrated by an injection well and a production well by displacing hydrocarbons toward the production well using a drive fluid such as water containing dissolved therein:

(a) a small amount of a nonionic surfactant of the formula $RO(CH_2CH_2O)_m(CH_2CH(OH)CH_2O)_nH$ where R is alkyl or alkylaryl, m is an integer of from 1 to about 20 and n is an integer of from 1 to about 8, and (b) a small amount of an anionic sulfonate and/or sulfate surfactant. Optionally the drive fluid may be saturated with natural gas and/or carbon dioxide at the injection pressure. A polymeric thickening agent also may be included in the drive fluid, if desired.

21 Claims, No Drawings

PROCESS FOR SECONDARY RECOVERY

This application is a continuation-in-part of application Ser. No. 112582, filed Jan. 16, 1980, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water containing dissolved therein:

(a) a small amount of a nonionic surfactant and
(b) a small amount of an anionic sulfonate or sulfate surfactant is utilized to displace hydrocarbons in the formation toward a production well.

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

The salinity sensitivity of the most desirable surfactants for use in oil recovery has a substantial impact on the economics of a proposed supplement recovery operation employing a surfactant. While it has been generally recognized in the industry for many years that surfactants capable of reducing the interfacial tension between the injected fluid and the formation petroleum would improve the oil recovery efficiency of a supplemental oil recovery program, it has never been demonstrated that the additional oil which can be recovered under field conditions is sufficient to justify the cost of the surfactant. This is especially true because of the enormous quantity of surfactant which must be employed in a field, in order to have a significant effect on the displacement efficiency. If high formation water salinity results in a shift in surfactant choice to a higher cost material or if a greater concentration of surfactant must be used, the cost of a surfactant flood will be increased substantially. It is known, however, that many millions of barrels of oil remain unrecovered in a petroleum reservoir at the conclusion of conventional water flooding operations, and with an impending shortage of readily recoverable crude oil, it is becoming a matter of paramount national importance to devise a reasonably economical method of recovering this oil.

There is a definite need in the art for a water flooding process employing surfactants which will function effectively in formations containing high salinity fluids and especially where such fluids contain a high concentration of divalent ions such as $Ca^{++}$ and $Mg^{++}$.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well a drive fluid comprising water having dissolved therein:

(a) a small amount of a nonionic surfactant of the formula:

$$RO(CH_2CH_2O)_m(CH_2CH(OH)CH_2O)_nH,$$

wherein m is an integer of from 1 to about 20 and n is an integer of from 1 to about 8, and (b) a small amount of an anionic sulfonate or sulfate surfactant, (B) forcing the fluid through the formation and
(C) recovering hydrocarbons through the production well.

An additional embodiment of this invention relates to the driving fluid compositions utilized in step (a) which may, if desired, be saturated with carbon dioxide, nitrogen, natural gas or mixtures thereof at the injection pressure which generally will be from about 300 to about 3000 psig. In still another embodiment, a minor amount of a water-soluble polymeric thickening agent such as polyacrylamide or partially hydrolyzed polyacrylamide may be included in the drive fluid.

The surfactant mixtures employed in the process of this invention are greatly superior to mixtures of anionic surfactants and available nonionic surfactants in stability and in ability to displace oil from high temperature formations containing high salinity brine with substantial amounts of divalent cations.

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

Nonionic surfactants (i.e., Type A surfactants) useful in this invention have the formula:

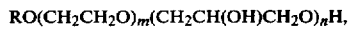

wherein R is selected from the group consisting of alkyl of from 8 to about 20 carbon atoms and

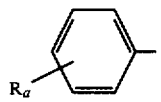

wherein $R_a$ is branched or linear alkyl of from 6 to 18 carbon atoms, wherein m is an integer of from 1 to about 20 and preferably 1 to about 12 and n is an integer of from 1 to about 8.

The nonionic surfactants described above can be prepared by alkoxylation methods well known in the art. For example, nonylphenol can be reacted in the presence of powdered potassium hydroxide in an autoclave equipped with a stirrer at a temperature of about 100° C. to about 150° C. with ethylene oxide pressured into the reactor with nitrogen to form an ethoxylated nonylphenol which in turn can then be reacted with the required amount of glycidol to yield the desired glycidol adduct of the ethoxylated nonylphenol product.

A number of other methods are set out in the art for conducting such alkoxylation reactions including those described in U.S. Pat. Nos. 2,131,142; 2,213,477; 2,233,381; 2,131,142; 3,879,475; 2,174,761; 2,425,845; 3,062,747; 3,380,765; 3,719,636; 3,879,475 and German Offen. No. 2,657,518 of July 7, 1977.

A wide variety of anionic sulfonate or sulfonate surfactants (i.e., Type B surfactants) can be employed in this secondary recovery process. One type of anionic sulfonate surfactant especially suitable for use in the process of this invention includes compounds of the formula:

wherein R is linear or branched chain alkyl having 6 to about 20 carbon atoms or R is the radical:

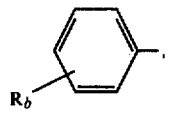

wherein $R_b$ is linear or branched chain alkyl of from about 6 to about 20 carbon atoms and M is a monovalent cation such as sodium, potassium or ammonium. Examples of such surfactants include ammonium dodecylsulfonate, sodium octadecylsulfonate, potassium octylbenzenesulfonate, sodium dodecylbenzenesulfonate, ammonium decylbenzenesulfonate, etc.

Another group of anionic sulfonate surfactants which may be utilized in this process includes compounds of the formula:

where $R_c$ is linear or branched chain alkyl of from 8 to about 20 carbon atoms or the radical

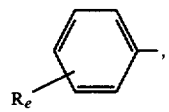

wherein $R_e$ is linear or branched chain alkyl of from 6 to about 20 carbon atoms, $R_d$ is alkylene of from 2 to 4 carbon atoms, r is an integer of from 1 to about 14 and M is a monovalent cation such as sodium, potassium, or ammonium.

As mentioned above anionic sulfate surfactants may also be used in the process of this invention. For example, suitable sulfate surfactants include compounds of the formula:

where $R_f$ is linear or branched chain alkyl of from 8 to about 26 carbon atoms, or the radical:

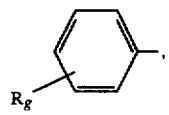

wherein $R_g$ is linear or branched chain alkyl of from 6 to about 26 carbon atoms, s is an integer of from 2 to about 16 and M is a monovalent cation such as sodium, potassium or ammonium.

Petroleum sulfonates which are presently among the more popular classes of anionic surfactants being considered for supplemental oil recovery techniques may also be used in this process. The various materials available under the general name of petroleum sulfonates vary in composition according to the petroleum fraction used for sulfonation and in the degree of sulfonation imparted to the petroleum fraction. A preferable petroleum sulfonate is described in U.S. Pat. No.

3,302,713 (1967) disclosing a petroleum sulfonate prepared from a petroleum fraction whose boiling range is from 700° F. to 1100° F. which corresponds to a molecular weight range of from about 350 to about 500. The sodium salt of the sulfonation product of this petroleum fraction is an excellent material for use in the subject invention.

Generally, the drive fluid of this invention will contain dissolved therein about 0.05 to about 6.0 weight percent of the previously described nonionic surfactant (i.e., Type A surfactant) and about 0.03 to about 5 weight percent of the anionic sulfonate and/or sulfate surfactant (i.e., Type B surfactant).

The preparation of glycidol adducts of ethoxylated nonylphenol suitable for use in the invention is shown in Examples I, II, and III which follow.

EXAMPLE I

A 250 ml flask equipped with nitrogen inlet, thermometer, addition funnel, and a coated stirring bar was charged with 48.5 g of the compound:

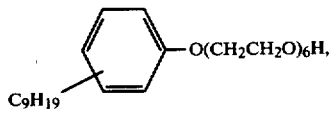

and 0.4 g potassium hydroxide. The mixture was heated with nitrogen purging and magnetic stirring at 100° C. for 45 minutes to remove water. Glycidol (23 g.) was next added with stirring at 120° C. over a 34 minute period followed by digestion at 120° C. for 45 minutes. The product (Surfactant AA) which was characterized by liquid chromatograph and hydroxyl group analyses was identified as:

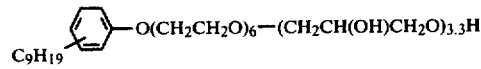

EXAMPLE II

A 1-liter flask was charged with 194 g of the compound:

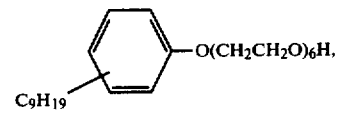

and 1.5 g potassium hydroxide and the mixture heated at 120° C. for 40 minutes in a nitrogen stream with magnetic stirring. Glycidol (92 g) was added to the stirred solution at 120° C. over a 30 minute period and the reaction mixture digested at 120° C. for an additional one hour. The recovered product (Surfactant BB) was:

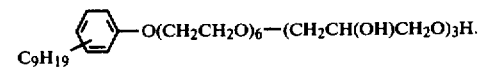

Solutions containing a total of 2.5 weight percent of surfactants were prepared by adding varying amounts of a blend of two petroleum sulfonates having different equivalent weights and the required weight of Surfactant BB to a high salinity brine. In these solutions the petroleum sulfonates constituted about 40 weight percent of the total weight of the surfactants added. The solutions were stored for a minimum of 24 hours at room temperature and then checked for stability.

Capillary displacement tests performed on the stable solutions at room temperature using oil containing 25 weight percent added heptane showed that the surfactant solutions with the required petroleum sulfonate balance were highly effective in recovering oil.

EXAMPLE III

A flask was charged with 64 g of the compound:

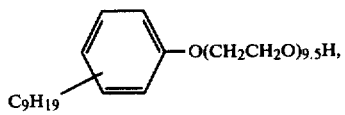

0.5 g KOH and 8 g glycidol and reacted according to the general method of Example 1. The product (Product CC), characterized by liquid chromatograph and hydroxyl group analysis, was identified as:

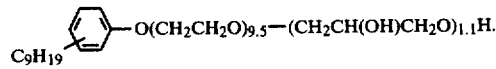

Hard Water Solubility Tests

A series of solubility tests was run with the product of Example III (Product CC). A 20,000-ppm hard water was prepared by dissolving 50.2 g $CaCl_2$ and 61.2 g $MgCl.6H_2O$ in one gallon of water. A 10:1 dilution of this hard water was used in the solubility tests.

Five different solubility test runs were made. During each test run, slow external heating of the solutions were employed to determine the temperature at which a clear solution became cloudy (cloud point) and/or a cloudy solution became clear (Krafft point).

In Run 1 the solubility of the standard surfactant tridecyl benzene sulfonate, sodium salt (M.W.=363) hereinafter called sulfonate surfactant, was demonstrated. The solubility of the surfactant of Example III alone is shown in Run 2. In Run 3 the solubility of the dual surfactant system using the sulfonate surfactant and the surfactant of Example III was demonstrated. In test Run 4 the standard nonionic surfactant nonylphenol 12-molar ethyoxylate (SURFONIC® N-120) was utilized. This surfactant was chosen for comparison with Product CC because it represents a standard ethoxylate prepared from the same hydrophobe containing no glyceryl groups and having an identical hydrophilelipophile balance. In Run 5 the dual sulfonate surfactant-/nonylphenol 12-molar ethoxylate system was used.

The results of the solubility tests are shown below.

| Test Run | Hardness (ppm) | Wgt. % Sulfonate Surfactant | Solubilizer (Weight %) | Cloud Point | Krafft Point |
|---|---|---|---|---|---|
| 1 | 2,000 | 1 | None | — | >100° C. |
| 2 | 2,000 | None | Product CC(1) | 77° C. | — |
| 3 | 2,000 | 1 | Product CC(1) | >100° C. | <0° C. |
| 4 | 2,000 | None | SURFONIC® N-120 (1) | 81.5° C. | — |
| 5 | 2,000 | 1 | SURFONIC® | 35° C. | >100° C. |

| Test Run | Hardness (ppm) | Wgt. % Sulfonate Surfactant | Solubilizer (Weight %) | Cloud Point | Krafft Point |
|---|---|---|---|---|---|
| | | | N-120 (1) | | |

From the test data the dual surfactant system employing the sulfonate surfactant/Product CC system is seen to have a greater temperature range of solubility than either Product CC alone, the sulfonate surfactant alone or a similar dual surfactant system using the standard nonionic surfactant, nonylphenol 12-molar ethoxylate.

The drive fluid of the invention may contain, if desired, about 0.01 to about 3.0 or more weight percent of a water-soluble polymer, i.e., a thickening agent, in order to increase the viscosity of the fluid and thus improve the oil displacement capability of the subject fluid. Useful polymers include for example, polyacrylamide, partially hydrolyzed polyacrylamide, polysaccharide, methyl cellulose, polyethylene oxide, polyvinyl aromatic sulfonate, etc. An especially preferred thickening agent is polyacrylamide or partially hydrolyzed polyacrylamide of the type described in McKennon U.S. Pat. No. 3,039,529. The molecular weights of such polyacrylamides which may be utilized in the drive fluid of this invention will range from about 10,000 to about 2,000,000 or more with the preferred range being from about 300,000 to about 1,500,000.

In some instances it may be desirable to include in the drive fluid an agent to prevent degradation of the thickening agent by bacterial action. Therefore, if desired, the drive fluid may contain along with polyacrylamide or partially hydrolyzed polyacrylamide or any other suitable thickening agent from about 0.01 to about 0.8 weight percent or more of, for example, of a water-soluble terpolymer comprising recurring E-type units of the formula:

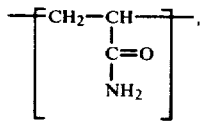

recurring F-type units of the formula:

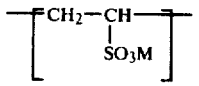

and recurring G-type units of the formula:

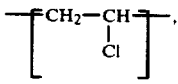

wherein M is selected from the group consisting of hydrogen, sodium, potassium and ammonia and wherein in the said terpolymer the weight percent of the E-type units ranges from about 60 to about 95, the weight percent of the G-type units ranges from about 2 to about 10 and with the balance being the F-type units. Generally, the number average molecular weight of the acrylamide-vinyl sulfonic acid or the sodium, potassium or ammonium salt thereof vinyl chloride terpolymers will range from about 5,000 to about 1,500,000 or more.

These terpolymers can be prepared by the usual vinyl compound polymerization methods. Such methods are more completely described in detail in Norton et al U.S. Pat. No. 3,779,917 and in Jahnke U.S. Pat. No. 3,892,720 both of which patents are incorporated herein in their entirety by reference. These same terpolymers may be employed as the sole thickening agent in the drive fluid which may, if desired, be saturated with carbon dioxide, nitrogen, natural gas and mixtures thereof at pressures ranging from about 300 to about 3000 psig. Also, the above-described acrylamide-vinyl sulfonic acid or sodium, potassium or ammonium salts thereof- vinyl chloride terpolymers described above can be alkoxylated, i.e., reacted with about 2 to about 100 weight percent and preferably about 10 to about 70 weight percent of ethylene oxide to form an alkoxylated terpolymer useful by itself or with other thickening agents in amounts of from about 0.01 to about 5.0 weight percent in the drive fluids of this invention.

The alkoxylation of acrylamide-vinyl sulfonic acid or sodium, potassium or ammonium salt thereof- vinyl chloride terpolymers can be conveniently conducted using methods well known in the art. For example, an aqueous solution comprising about 10 to about 30 weight percent or more of the acrylamide polymer in water along with about 0.5 weight percent or more of powdered potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more following which the autoclave is allowed to cool to room temperature and then vented. The reaction product remaining after being stripped to remove volatile materials yields the water-soluble, alkoxylated copolymer. Such alkoxylation methods are described in greater detail in U.S. Pat. Nos. 2,213,477; 2,174,761; 2,425,845; 3,062,747, etc.

The following example illustrates the preparation of an alkoxylated acrylamide-sodium vinyl sulfonate-vinyl chloride terpolymer.

EXAMPLE IV

A total of 400 cc of water, 5 g. of powdered potassium hydroxide and 65 g. of polyacrylamide-sodium vinyl sulfonate-vinyl chloride (number average molecular weight of about 250,000, 75 weight percent acrylamide, 8 weight percent vinyl chloride and 17 weight percent sodium vinyl sulfonate) are added to an autoclave which is then heated to a temperature of 130° C. Ethylene oxide in the amount of 38 g. is added to the autoclave under nitrogen pressure over a 1.1 hour period during which time the temperature of the autoclave is maintained at 130° C. Next, the autoclave and contents are allowed to cool to room temperature after which the autoclave is vented. The reaction mixture is then stripped of volatiles using a nitrogen purge. The resulting water-soluble product is the polyacrylamide-sodium vinyl sulfonate-vinyl chloride terpolymer alkoxylated with about 34 weight percent of ethylene oxide.

Optionally, the aqueous drive fluid of this invention may be saturated with carbon dioxide and/or natural gas at the injection pressure which generally will be from about 300 to about 3000 psig or more.

The hydrocarbon recovery process of this invention is best understood by reference to the following example which is offered only as an illustrative embodiment of this invention and is not intended to be limitative.

EXAMPLE V

In a field in which the primary production has already been exhausted, an injection well is completed in the hydrocarbon-bearing formation and perforations are formed between the interval of 5130–5145 feet. A production well is drilled approximately 415 feet distance from the injection well, and perforations are similarly made in the same hydrocarbon-bearing formation at 5135–5150 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at 1200 psig at a temperature of 70° F. containing dissolved therein about 0.92 weight percent of a nonionic surfactant of the formula:

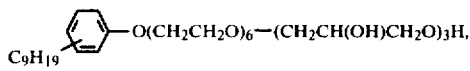

and containing dissolved therein 0.43 weight percent of a polyacrylamide-sodium vinyl sulfonate-vinyl chloride terpolymer (75 weight percent acrylamide, 17 weight percent sodium vinyl sulfonate and 8 weight percent vinyl chloride) having a number average molecular weight of about 265,000 alkoxylated with about 14 weight percent of ethylene oxide prepared in the manner previously described in Example III above is injected via the injection well into the formation at a pressure of about 1200 psig and at the rate of 0.85 barrel per minute. Injection of the driving fluid is continued at the rate of about 1 barrel per minute and at the end of 75 days the rate of production of oil is substantially greater than with water injection alone.

We claim:

1. A process for recovering hydrocarbons from a subterranean hydrocarbon-bearing formation penetrated by an injection well and a production well which comprises:
   (A) injecting into the formation via an injection well a drive fluid comprising water having dissolved therein:
   (a) from 0.05 to about 6.0 weight percent of a nonionic surfactant of the formula:

wherein R is selected from the group consisting of alkyl of from 8 to about 20 carbon atoms and

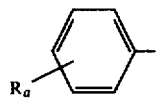

wherein $R_a$ is branched or linear alkyl of from 6 to about 18 carbon atoms, wherein m is an integer of from 1 to about 20 and n is an integer of from 1 to about 8, and (b) about 0.03 to about 5.0 weight percent of a surfactant selected from the group consisting of an anionic sulfonate and an anionic sulfate surfactant, (B) forcing the said fluid through the formation, and
   (C) recovering hydrocarbons through the production well.

2. The process of claim 1 wherein in (b) the surfactant employed is petroleum sulfonate.

3. The process of claim 1 wherein the said drive fluid is saturated with a material selected from the group consisting of carbon dioxide, nitrogen, natural gas and mixtures thereof at a pressure of about 300 to about 3000 psig.

4. The process of claim 1 wherein the said drive fluid is saturated with carbon dioxide at a pressure of about 300 to about 3000 psig.

5. The process of claim 1 wherein the said fluid is saturaged with nitrogen at a pressure of about 300 to about 3000 psig.

6. The process of claim 1 wherein the said drive fluid also contains about 0.01 to about 3.0 weight percent of a water-soluble polymer.

7. The process of claim 1 wherein the said drive fluid also contains about 0.01 to about 3.0 weight percent of polyacrylamide or partially hydrolyzed polyacrylamide having a number average molecular weight of from about 10,000 to about 2,000,000.

8. The process of claim 1 wherein in (b) the surfactant employed is a compound of the formula:

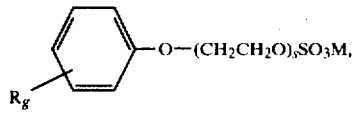

wherein $R_g$ is linear or branched chain alkyl of from 6 to about 26 carbon atoms, s is an integer of from 2 to about 16 and M is a monovalent cation selected from the group consisting of sodium, potassium and ammonium.

9. The process of claim 1 wherein in (b) the surfactant employed is a compound of the formula:

wherein $R_c$ is selected from the group consisting of linear or branched chain alkyl of from 8 to about 20 carbon atoms and the radical:

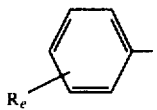

wherein $R_e$ is linear or branched chain alkyl of from 6 to about 20 carbon atoms, $R_d$ is alkylene of from 2 to 4 carbon atoms, r is an integer of from 1 to about 14 and M is a monovalent cation selected from the group consisting of sodium, potassium and ammonium.

10. The process of claim 9 wherein $R_c$ is linear or branched chain alkyl of from 8 to about 20 carbon atoms.

11. The process of claim 10 wherein $R_c$ is the radical:

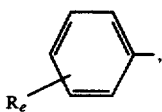

wherein $R_e$ is linear or branched chain alkyl of from 6 to about 20 carbon atoms.

12. A process for recovering hydrocarbons from a subterranean hydrocarbon-bearing formation penetrated by an injection well and a production well which comprises:

(A) injecting into the formation via an injection well a drive fluid comprising water having dissolved therein:

(a) from 0.05 to about 6.0 weight percent of a nonionic surfactant of the formula:

wherein R is selected from the group consisting of alkyl of from 8 to about 20 carbon atoms and

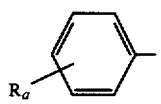

wherein $R_a$ is branched or linear alkyl of from 6 to about 18 carbon atoms, wherein m is an integer of from 1 to about 20 and n is an integer of from 1 to about 8, and (b) about 0.03 to about 5.0 weight percent of a surfactant selected from the group consisting of an anionic sulfonate and an anionic sulfate surfactant;

and wherein the said drive fluid also includes dissolved therein a minor amount of a thickening agent selected from the group consisting of:

(c) a terpolymer of acrylamide, vinyl sulfonic acid or the sodium, potassium or ammonium salt thereof and vinyl chloride, having a number average molecular weight of about 5,000 to about 1,500,000, and (d) a terpolymer of acrylamide, vinyl sulfonic acid or the sodium, potassium or ammonium salt thereof and vinyl chloride having a number average molecular weight of about 5,000 to about 1,500,000, alkoxylated with about 2 to about 100 percent by weight of ethylene oxide;

(B) forcing the said drive fluid through the formation, and (C) recovering hydrocarbons through the production well.

13. The process of claim 12 wherein (b) the surfactant employed is a compound of the formula:

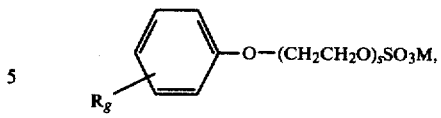

wherein $R_g$ is linear or branched chain alkyl of from 6 to about 26 carbon atoms, s is an integer of from 2 to about 16 and M is a monovalent cation selected from the group consisting of sodium, potassium and ammonium.

14. The process of claim 12 wherein in (b) the surfactant employed is petroleum sulfonate.

15. The process of claim 12 wherein the said drive fluid is saturated with a material selected from the group consisting of carbon dioxide, nitrogen, natural gas and mixtures thereof at a pressure of about 300 to about 3000 psig.

16. The process of claim 12 wherein the said drive fluid is saturated with carbon dioxide at a pressure of about 300 to about 3000 psig.

17. The process of claim 12 wherein the said fluid is saturated with nitrogen at a pressure of about 300 to about 3000 psig.

18. The process of claim 12 wherein the said drive fluid also contains about 0.01 to about 3.0 weight percent of polyacrylamide or partially hydrolyzed polyacrylamide having a number average molecular weight of from about 10,000 to about 2,000,000.

19. The process of claim 12 wherein in (b) the surfactant employed is a compound of the formula:

wherein $R_c$ is selected from the group consisting of linear or branched chain alkyl of from 8 to about 20 carbon atoms and the radical:

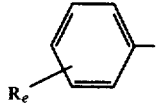

wherein $R_e$ is linear or branched chain alkyl of from 6 to about 20 carbon atoms, $R_d$ is alkylene of from 2 to 4 carbon atoms, r is an integer of from 1 to about 14 and M is a monovalent cation selected from the group consisting of sodium potassium and ammonium.

20. The process of claim 19 wherein $R_c$ is linear or branched chain alkyl of from 8 to about 20 carbon atoms.

21. The process of claim 20 wherein $R_c$ is the radical:

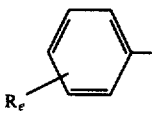

wherein $R_e$ is linear or branched chain alkyl of from 6 to about 20 carbon atoms.

* * * * *